Aug. 20, 1963  I. L. GLERUM  3,101,445
ELECTRICAL MEASURING INSTRUMENT WITH A CONSTANT SPEED
MOTOR INDUCTIVELY DRIVING A SPRING
BIASED ENERGIZED ARMATURE
Filed Jan. 11, 1961
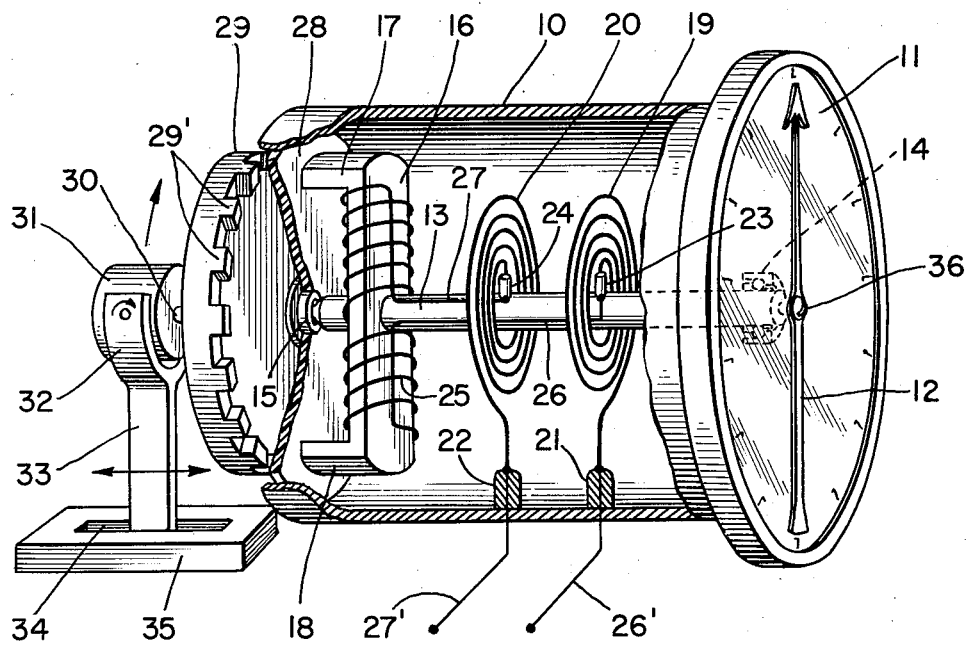
INVENTOR.
IRVIN L. GLERUM
BY
*Elliott & Pastoriza*
ATTORNEYS 3,101,445
Patented Aug. 20, 1963

3,101,445
ELECTRICAL MEASURING INSTRUMENT WITH A CONSTANT SPEED MOTOR INDUCTIVELY DRIVING A SPRING BIASED ENERGIZED ARMATURE
Irvin L. Glerum, Canoga Park, Calif., assignor to W. C. Dillon & Company, Inc., a corporation of California
Filed Jan. 11, 1961, Ser. No. 82,087
7 Claims. (Cl. 324—139)

This invention relates generally to electrical instruments and more particularly to a novel dial type meter providing a reading in response to an input electrical signal.

Conventional electrical meters usually comprise a stationary permanent magnet or stationary electrically energized stator coils within which a rotatively mounted armature is positioned. The armature itself is wound with one or more coils connected to receive input electrical energy. Suitable restraining means are connected to the armature to hold it in an initial position with its poles displaced with respect to the stator poles so that movement of the armature will take place when the armature coils are energized by an input signal. Any suitable type of output indicator, such as a simple pointer and dial card, may be used to indicate the rotative position of the armature. The degree of movement constitutes a function of the input electrical energy.

The operating range of meters of the above type is somewhat limited since the armature can ordinarily move no more than ninety degrees. This is a direct consequence of the stationary positioning of the stator windings with respect to the armature. Thus, any angular movement of the armature beyond ninety degrees in the case of a four-pole structure or 180 degrees in the case of a two-pole structure would be prevented by the stator poles attracting in a reverse direction the armature poles.

With the foregoing in mind, it is a primary object of this invention to provide a novel meter in which the range through which the counterpart to the conventional armature may swing is considerably extended.

More particularly, it is an object to provide a meter employing a dial and pointer in which the pointer may be made to swing up to and beyond 360 degrees to the end that a far larger range of values to be indicated can be realized with a single instrument.

Other objects of the invention are to provide an improved meter in which the sensitivity of the meter may be readily adjusted and in which the functional relationship between the input electrical energy and the degree of arcuate movement of the meter pointer itself over a given range may be varied to suit various non-linear conditions.

Briefly, these and other objects and advantages of this invention are attained by providing a magnetic body instead of the conventional stator and mounting it for rotation at a constant speed in one direction. An armature member in turn is mounted for rotation in a position in flux coupling relationship to the magnetic body. Suitable means are provided for biasing the armature member to an initial position. The armature member itself is wound with a coil connected to receive input electrical energy so that a flux is established in the armature in response to energization of the coil. With the magnetic body rotating at a constant speed, the establishment of flux in the armature will result in a torque being exerted continuously on the armature in one direction corresponding to the direction of rotation of the magnetic body. The armature will therefore tend to rotate in this direction through an angle which may easily exceed 360 degrees, the degree of movement being a function of the input electrical energy.

By varying the distance between the rotating magnetic body and armature, the sensitivity of the meter may be adjusted. Moreover, by tilting the rotating magnetic body with respect to the plane of rotation of the armature, the functional relationship between the degree of movement over a given range and the input electrical energy may be varied.

A better understanding of the invention will be had by now referring to the single schematic drawing showing a cut-away perspective view of the basic components making up the electrical measuring instrument.

Referring to the drawing, the instrument comprises a casing 10 provided with a front dial 11 and centrally mounted pointer 12. Within the casing 10, there is journaled a shaft 13 as by a suitable front journal bearing 14 and rear journal bearing 15. An armature member 16 including diametrically opposite pole pieces 17 and 18 is secured for rotation with the shaft 13. Biasing means in the form of first and second hair springs 19 and 20, in turn, are wound in opposed relationship and serve to bias the shaft and armature to an initial given position. The outer ends of the hair springs may be secured to the casing 10 as at 21 and 22 and the inner ends secured to the shaft 13 as at 23 and 24.

In addition to biasing the armature 16 to an initial position, the hair springs 19 and 20 also serve as lead-in conductors for a coil 25 wound about the armature 16. Thus, the ends of the coil 25 are brought along the shaft 13 as shown at 26 and 27 to connect, respectively, to the inner ends of the hair springs 19 and 20 at 23 and 24. Suitable input leads 26' and 27', in turn, connect to the outer ends of the hair springs at 21 and 22. With this arrangement, input electrical energy applied to the input leads 26' and 27' will be passed through the respective hair springs 19 and 20 and the corresponding conductors 26 and 27 to energize the coil 25 and generate flux in the armature 16.

The rear end of the casing 10 is closed off by a non-magnetic end wall 28 disposed relatively close to the ends of the pole pieces 17 and 18 of the armature 16. This end wall 28 will serve to shield the armature 16 from air movement created by wheel 29 as well as to protect the various elements within the casing 10 from dirt, dust, and the like.

Positioned adjacent to the opposite side of the end wall 28 is a wheel 29 formed of magnetic material. The periphery of the wheel 29 is preferably notched to define a plurality of projecting teeth 29' extending axially towards the end wall 28. This wheel is mounted by a shaft 30 in co-axial alignment with the shaft 13 within the casing 10 and is arranged to be rotated at a constant speed by a synchronous motor 31. The motor 31 is mounted by a suitable adjustable means including a gimbal frame 32 and base pedestal 33 slidable in an axial direction within a suitable slot 34 in a base frame plate 35. With this arrangement, the distance between the wheel 29 and the opposing pole pieces 17 and 18 of the armature 16 may be varied by sliding the pedestal 33 back and forth in the base plate 35 as indicated by the double-headed arrow. Further, the wheel 29 may also be tilted with respect to the plane of rotation of the armature 16 so that a variable distance between the pole pieces 17 and 18 and the wheel is realized with changes in the angular position of the armature.

Zero adjustment of the pointer 12 may be achieved by a simple screw 36 mounting the pointer 12 to the shaft 13. By loosening the screw 36, the pointer may be moved independently of the shaft for proper zero setting. Alternatively, either one or both of the hair springs 19 or 20 could be made movable at their point of securement to the casing to provide a zero-set condition. Any other suitable zero setting means may be used.

The operation of the meter will be evident from the foregoing description. Initially, the wheel 29 is caused to rotate at a constant speed in a given direction as indicated by the arrow. In the absence of any signal on the input leads 26' and 27', there will be no flux established within the armature 16. Therefore, the rotating magnetic wheel 29 will not affect the armature, and the armature will be retained in an initial position determined by the biasing springs 19 and 20. When electrical energy is now applied at the input leads 26' and 27', the coil 25 will be energized through the medium of the hair springs 19 and 20 to establish a flux in the armature 16 and pole pieces 17 and 18. This flux will thread through the magnetic wheel 29 and because of the rotation of the latter, a torque will be exerted on the armature 16 tending to rotate the armature in the direction of rotation of the wheel. This rotation of the armature will be opposed by the springs 19 and 20 and therefore, after a given angular rotation, a point of equilibrium will be reached at which the armature will no longer move. This point will be a function of the magnitude of the input electrical energy and thus the reading of the pointer 12 will constitute a function of the input electrical energy.

It will be evident from the geometry of the device that the only limitation on the number of turns through 360 degrees the armature 16 can make is the length of the hairsprings 19 and 20. Thus, a spiral type scale could be employed on the dial face 11 of the instrument so that a relatively large range of values may be read.

As mentioned heretofore, by changing the linear distance in an axial direction of the wheel 29 from the opposing pole pieces 17 and 18, the overall sensitivity of the device may be readily adjusted. Also, non-linearities between the magnitude of the input signal and established torque in the armature 16 can be compensated for by a proper tilting of the wheel 29 with respect to the plane of rotation of the armature 16. In this latter case, however, the meter would only operate effectively through an angle of 180 degrees, but in many instances, this range will be sufficient.

It should be understood that by rotating the wheel 29 in an opposite direction, the meter will operate in an identical manner except that the pointer 12 will move in a counterclockwise direction with increased values of input electrical energy rather than in a clockwise direction.

While only one particular embodiment has been set forth in schematic form, it should be understood that many modifications falling clearly within the scope and spirit of this invention can be effected by those skilled in the art. The electrical measuring instrument is therefore not to be thought of as limited to the particular example set forth merely for illustrative purposes.

What is claimed is:

1. An electrical measuring instrument comprising, in combination: a casing; a dial on the front of said casing; a pointer centrally mounted to said dial; a shaft journaled for rotation within said casing coupled to said pointer; an armature having first and second diametrically spaced pole pieces connected to said shaft; first and second hair springs secured between said shaft and casing in opposed relationship biasing said shaft and pointer to an initial position; a coil surrounding said armature and having its ends connected to the ends of said hair springs secured to said shaft respectively; input leads connected to the other ends of said hairsprings secured to said casing respectively; a non-magnetic end wall closing the rear of said casing; a wheel formed of magnetic material mounted in co-axial alignment with said shaft on the opposite side of said non-magnetic end wall in flux coupling relationship with said armature; and a motor connected to rotate said wheel at a given speed and in a given direction, whereby a magnetic torque is exerted on said armature by said wheel in said given direction when said coil is energized, said torque rotating said armature, shaft, and pointer as a unit against the bias of said hair springs an arcuate distance constituting a function of the electrical energy applied to said input leads for energizing said coil.

2. An electrical measuring instrument, according to claim 1, in which the peripheral portion of said wheel facing said non-magnetic end wall is notched to define teeth projecting in an axial direction towards said end wall.

3. An electrical measuring instrument, according to claim 2, including movable mounting means for said wheel whereby its axial distance from said armature may be varied to change the torque exerted on said armature for a given value of said electrical energy.

4. An electrical measuring instrument, according to claim 3, in which said movable mounting means include means for tilting said wheel with respect to the plane of rotation of said armature whereby the functional relationship between the arcuate distance through which said pointer means moves and the electrical energy applied to said input leads may be varied.

5. An electrical measuring instrument, according to claim 4, including means for shifting the position of said pointer in the absence of said electrical energy to enable zero-setting of said instrument.

6. An electrical measuring instrument comprising: a magnetic body; means for rotating said magnetic body; a casing structure; an armature member mounted for rotation within said casing structure in a position in flux coupling relationship to said magnetic body; biasing means comprising at least two hair springs secured between said armature member and said casing in opposed relationship to bias said armature member to an initial position; a coil wound about said armature member and having its ends connected, respectively, to the ends of said hair springs; a pair of input leads passing into said casing structure and connecting to the other ends of said hair springs to pass input electrical energy to said coil for generating flux in said armature member whereby a torque is exerted on said armature member by said rotating magnetic body to swing said armature member through an angle against said biasing means, said angle being a function of the value of said input electrical energy; and means for indicating the degree of rotation of said armature member.

7. An electrical measuring instrument according to claim 6, in which said magnetic body is rotated in one direction at a constant speed, said armature member being capable of swinging through an angle at least equal to 360 degrees.

References Cited in the file of this patent

UNITED STATES PATENTS

| | | |
|---|---|---|
| 2,492,537 | Root | Dec. 27, 1949 |
| 2,637,762 | Lunas | May 5, 1953 |
| 2,917,707 | Perry | Dec. 15, 1959 |
| 2,940,044 | Warsaw | June 7, 1960 |